Jan. 10, 1967  L. N. DAVIS  3,297,108
SHOPPING CARRIER
Filed Sept. 9, 1965  2 Sheets-Sheet 2
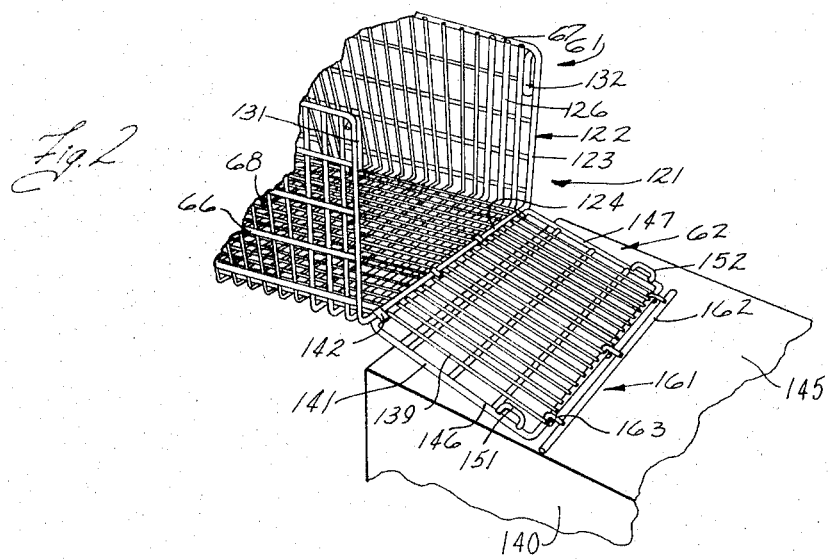
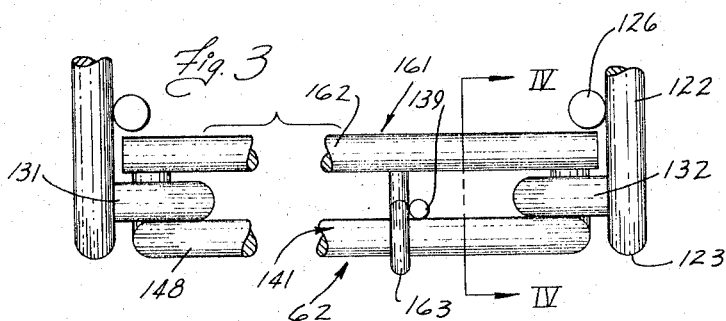
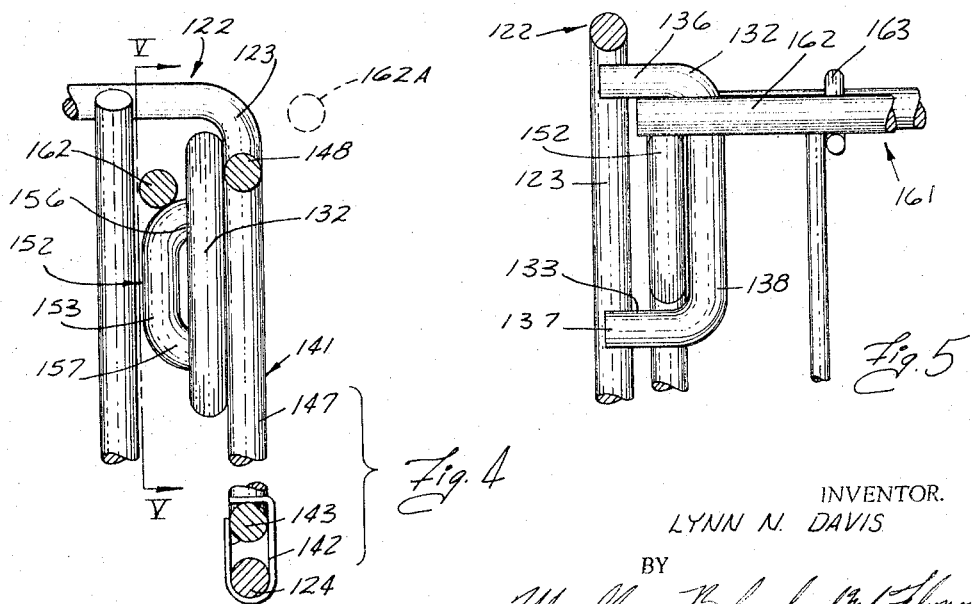
INVENTOR.
LYNN N. DAVIS
BY
Woodhams, Blanchard & Flynn
ATTORNEYS __United States Patent Office__

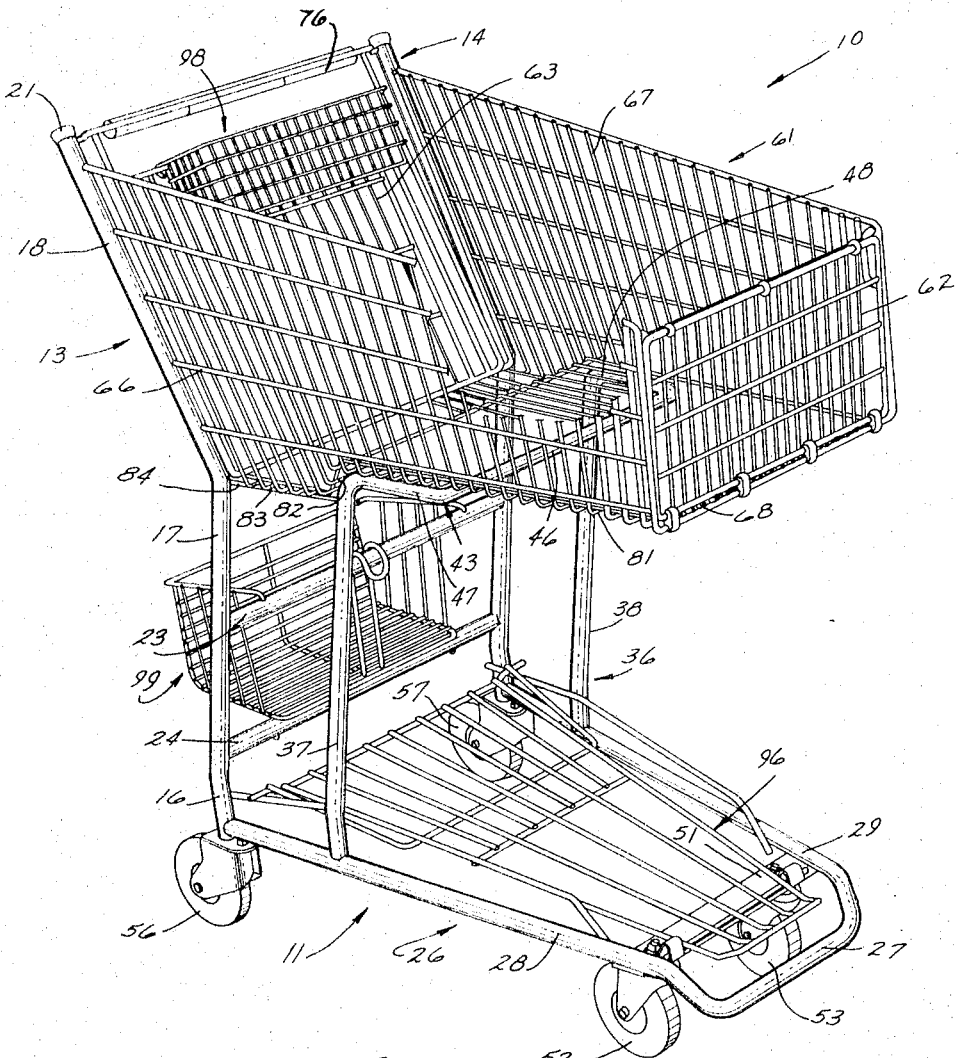

3,297,108
Patented Jan. 10, 1967

3,297,108
SHOPPING CARRIER
Lynn N. Davis, Emmett Township, Calhoun County, Mich., assignor to United Steel and Wire Company, Battle Creek, Mich., a corporation of Michigan
Filed Sept. 9, 1965, Ser. No. 486,161
9 Claims. (Cl. 186—1)

This invention relates to a shopping carrier construction and more particularly relates to a closure construction for a shopping carrier basket wall.

Prior shopping carriers of the kind found in supermarkets and the like generally include a basket for carrying goods supported on a substantially rigid frame which, in turn, is mounted on ground engaging casters. Typically, the basket bottom is elevated above the floor, generally at a height near the top surface of the checkout counter of the supermarket. A manually engageable handle fixed to the frame at the rear of the basket allows the user to propel a carrier as desired.

The walls of the shopping carrier basket are generally relatively high in order to hold goods of cumbersome size within the basket and to enable a large volume of goods to be held within an area of reasonable length and width. It is not uncommon for the average height of the walls of such baskets to reach or exceed as much as 15 inches while the maximum height thereof may be as much as or more than a foot and a half.

Substantial effort is required to load such prior shopping carrier baskets with a relatively heavy object or to unload a heavy object therefrom since the object must be moved vertically through an appreciable distance in order to clear the relatively high walls of the basket.

Moreover, when a large number of articles are to be manually loaded into or unloaded from the basket in rapid succession, such as is the case when a shopper transfers merchandise from the carrier basket to the checkout counter, the necessity for lifting each article over the relatively high walls of the basket adds materially to the effort which the shopper must put forth to unload the basket.

However, shopping carriers of the type described have a variety of other requirements which cannot be sacrificed in order to ease loading and unloading of the basket. For example, shopping carriers of the type described are normally subjected to harsh usage in terms of rough handling and overloading and must be capable of withstanding such usage without ill effect.

Although prior shopping carriers are known which have openable forward basket walls, such prior carriers generally fail to meet other requirements for a satisfactory carrier basket construction which it is among the objects of the present invention to meet.

Accordingly, the objects of this invention include:

(1) To provide a shopping carrier having an improved basket construction arranged for easier loading and unloading.

(2) To provide a shopping carrier basket which has a movable wall to allow improved access to the interior of the carrier basket.

(3) To provide a carrier, as aforesaid, in which the forward wall may be lowered to a relatively horizontal position extending ahead of the basket, thus forming a ramp over which articles may be moved from the basket to the checkout counter without the necessity of lifting the article.

(4) To provide a carrier basket, as aforesaid, in which no sacrifice in strength is made in order to provide improved access to the load therewithin and which is substantially as strong as previous shopping carrier baskets.

(5) To provide a carrier basket, as aforesaid, in which the movable wall when closed assists in maintaining the adjacent walls in rigid spaced relationship to each other.

(6) To provide a carrier basket, as aforesaid, in which means are provided to positively lock the movable wall in its closed position despite relatively large opening forces exerted on the movable wall.

(7) To provide a carrier basket, as aforesaid, in which the movable wall and locking means therefore are readily operated by shoppers not previously acquainted with carriers of this type immediately and without instructions.

(8) To provide a carrier basket, as aforesaid, the movable wall and locking means of which operate smoothly with little effort and are free from binding.

(9) To provide a shopping carrier, as aforesaid, capable of nesting in a conventional manner with other similar carriers and in which the provision of a movable basket wall in no way interferes with such nesting.

(10) To provide a shopping carrier, as aforesaid, which can be manufactured and sold without significant increase in cost over prior shopping carriers and which is readily manufacturable with currently available tools.

(11) To provide a carrier, as aforesaid, which is sturdily constructed and able to withstand harsh and unusual usage without failure, which will readily withstand rough handling and overloading, which will be capable of a long service life with little or no maintenance and which is readily maintainable.

Other objects and purposes of this invention will be apparent to persons reading the following specification and inspecting the accompanying drawings.

In the drawings:

FIGURE 1 is a partially broken oblique view of a shopping carrier embodying the invention.

FIGURE 2 is a fragment of FIGURE 1 showing a portion of the carrier basket in a different position of use.

FIGURE 3 is a fragmentary top elevational view of the movable wall of the carrier basket in its closed and latched position.

FIGURE 4 is a fragmentary sectional view taken on the line IV—IV of FIGURE 3.

FIGURE 5 is a fragmentary sectional view taken on the line V—V of FIGURE 4.

Certain terminology will be used in the following description for convenience in reference only and will not be limiting. The words "upwardly," "downwardly," "rightwardly" and "leftwardly" will designate directions in the drawings to which reference is made. The words "forwardly" and "rearwardly" will refer to the normal direction of movement of the shopping carrier and to the opposite direction, respectively, which directions are to the right and left, respectively, in FIGURES 1 and 2. The words "inwardly" and "outwardly" will refer to directions toward and away from, respectively, the geometric center of the device and designated parts thereof. Said terminology will include the words above specifically mentioned, derivatives thereof and words of similar import.

GENERAL DESCRIPTION

In general, the objects and purposes of this invention are met by providing an end closure for the basket of a shopping carrier, such basket including a spaced pair of generally upstanding side walls and a bottom wall extending between the side walls. A generally planar closure member is hinged at its lower edge on the forward edge of the bottom basket wall for improving access to the basket. The closure member is pivotable into a closed position in which the side edges thereof are disposed snugly between the ends of the side walls for closing the forward end of the basket and limiting inward movement of the side walls. Alternatively, the closure member is pivotable forwardly and downwardly away from the forward end of the basket for opening same. The closure member may be opened fully and allowed to depend from the forward edge of the bottom basket wall or alternatively, may be rested in a substantially horizontal position upon the top of the supermarket check-out counter for providing a ramp over which goods may be moved from the basket to the counter. Stop members are affixed to the ends of the side walls adjacent the upper edges thereof and extend inwardly therefrom, said stop members being engageable by the closure member as it is swung into its closed position to limit movement of the closure member into the interior of the basket. Rearwardly extending insertion members are provided adjacent each side edge of the closure member near the upper edge thereof. The insertion members are snugly insertable through openings in the stop members when the closure member is moved to its closed position, the interengagement of the insertion and stop members causing the closed closure member to limit sideward movement of the side walls. Positive latch means including a transversely extending latching rod are provided for maintaining the closure member in its closed position. The latching rod is spaced from the upper edge of the closure member and is pivotally mounted thereon. Thus upon closure of the closure member, the latch rod may be pivoted rearwardly and downwardly over the upper edges of the stop members so that the stop members are snugly held between the ends of the latch bar and the closure member.

DETAILED DESCRIPTION

The carrier 10 (FIGURE 1) embodying the present invention includes a rigid frame 11. The frame 11 includes a transversely spaced pair of uprights 13 and 14, each comprising a short vertical lower segment 16, a slightly forwardly inclined intermediate segment 17 and a rearwardly angled upper segment 18. Caps 21 preferably of plastic or the like close the upper ends of the uprights 13 and 14 which, in the particular embodiment shown, are of metal tubing. Transverse cross braces 23 and 24 rigidly connect the intermediate segments 17 of the uprights 13 and 14. The frame 11 includes a base member 26 comprising a pair of side portions 28 and 29 which converge forwardly from the lower segments 16 of the uprights 13 and 14 and terminate in a transverse forward portion 27.

The frame 11 further includes a basket support member 36 which is spaced forwardly from the uprights 13 and 14 and includes legs 37 and 38 upstanding from the side portions 28 and 29, respectively, and generally paralleling the lower portion 16 and intermediate portion 17 of said uprights. A rearwardly opening, U-shaped basket supporting portion 43 extends forwardly from and joins the upper ends of the legs 37 and 38 and has forwardly extending longitudinal portions 47 and 48 joined by a bight 46.

A transverse cross member 51 is rigidly secured to the base member 26 adjacent the forward end thereof. Swivel casters 52 and 53 are fixed beneath the ends of the cross member 51 and further casters 56 and 57 are fixed below the lower ends of the uprights 13 and 14 by any convenient means, not shown, for supporting the carrier 10 for movement.

The carrier 10 further includes an article carrying container 61 preferably constructed from metal rods welded together to form a mesh. The container or basket 61 has a forward wall 62, a rearward wall 63, side walls 66 and 67 and a bottom wall 68. In the preferred embodiment shown, the side walls are integral with the bottom wall, a number of rods in the bottom wall being continued in the side wall. The side walls 66 and 67 are preferably upstanding and converge towards the front ends thereof to allow nesting. The rearward ends of the side walls 66 and 67 are rigidly affixed to the forward faces of the upper segments 18 of the uprights 13 and 14 by any convient means, not shown.

The rearward wall 63 is rigidly affixed to and depends from a transverse, manually engageable handle 76 for propelling the carrier 10. The ends of the handle 76 are pivotally supported on the upper ends of the uprights 13 and 14. The side edges of the rear wall 63 are spaced within the uprights 13 and 14 when the rearward wall is closed as shown in FIGURE 1. The lower edge of the rearward wall 63 preferably bears against the bottom wall 68 adjacent the rearward edge thereof to limit rearward movement thereof. The rearward wall 63 is pivotable forwardly and upwardly about the axis of the handle 76 for opening the rearward end of the basket 61 to allow the basket of another carrier to nest therewithin. The construction of the rearward wall 63 and the handle 76 is disclosed in detail in my copending application Serial No. 486,000 and, thus, further description is believed unnecessary.

The bottom wall 68 of the basket 61 has a forward portion 81 which is supported on the basket supporting portion 43 and affixed thereto by any convenient means, not shown. In the particular embodiment shown, the basket bottom 68 is stepped downwardly behind the basket support member 36 as indicated at 82, the rearward portion 83 thereof lying below the level of the forward portion 81. Brace rods 84 preferably extend beneath the rearward portion 83 of the basket bottom 68 and connect the uprights 13 and 14 with the legs 37 and 38, respectively.

The particular shopping carrier shown further includes a lower shelf 96 of any conveninet construction normally disposed between the side portions 28 and 29 of the base member 26.

If desired, the carrier 10 may be provided with a box 98 of any convenient type supported on the inside of the rear wall 63 of the basket 61 for carrying small articles or the like. Further, the carrier 10 may, if desired, be furnished with a child seat 99 of any convenient type, here for example, removably affixed to the cross braces 23 and 24 by any convenient means and extending rearwardly therefrom. Alternatively, the box 98 and child seat 99 may be omitted and it is fully contemplated that, if desired, the rearward wall 63 of the basket 61 may be used to support a collapsible child seat of the type generally disclosed in U.S. Patent No. 2,911,227 assigned to the assignee of the present invention.

The carrier 10 as above described has been disclosed as a preferred example of the type of shopping carrier into which the present invention may be incorporated. However, it will be understood that the present invention is not limited to the particular carrier 10 above described but may be used in a wide variety of different carriers. Further details of the carrier 10 above described are disclosed in my copending applications Serial No. 486,000, filed September 9, 1965, and 486,164, filed September 9, 1965.

Turning now to the particular details of the carrier 10 more closely related to the present invention, the perimeter of the basket 61 is provided with a closable opening which, in the preferred embodiment shown, is at the forward end of said basket and is generally indicated in FIGURE 2 at 121. The opening 121 is defined between the forward edges of the side walls 66 and 67 and bottom wall 68. The forward edges of the side walls 66 and 67 and at the bottom wall 68 are, in the particular embodiment shown, defined by a continuous rod 122 of relatively heavy gauge which also defines the top of the side walls 66 and 67, the upstanding portions of the rod 122 being indicated at 123 and the transverse portion thereof being indicated at 124. In the particular embodiment shown, several of the rods 126 paralleling the portions 123 and 124 of the front rod 122 are also of relatively heavy gauge for assisting in strengthening of forward edge of the basket.

Stop members 131 and 132 (FIGURES 2, 3, and 5) are affixed to the side walls 66 and 67 adjacent the upper and forward corners thereof and extend transversely inwardly therefrom. The stop members 131 and 132 preferably are oppositely oriented and identical in construction. Hence, the following detailed description of the stop member 132 will also suffice for the stop member 131.

The stop member 132 is provided with an opening 133 therethrough which is aligned longitudinally of the basket 61. In the particular embodiment shown, the opening 133 is vertically elongated. The stop member 132 is preferably constructed as a generally U-shaped steel rod having legs 136 and 137 (FIGURE 5) the inner ends of which are vertically spaced and are connected by an integral bight 138 the legs 136 and 137 and the part of the uprigidly fixed preferably by welding to the rearward face of the standing portion 123 of the rod 122, the upper leg 136 lying just under the upper end of such upstanding portion 123. Thus, the opening 133 is bounded by the bight 138 the legs 136 and 137 and the part of the upstanding portion 123 between said legs.

The forward wall 62 above described comprises a closure member for closing the forward end of the basket 61. In the particular embodiment shown, the closure member 62 is formed of a plurality of rods 139 extending at right angles to and in parallelism with the portion 124, said rods being welded to form a rigid, substantially planar grid bounded by a continuous, relatively heavy gauge perimeter rod 141.

The bottom edge of the closure member 62 is hinged to the forward edge of the bottom wall 68 of the basket 61 by a plurality, here four, of preferably evenly spaced hinges 142 (FIGURES 2 and 4). In the particular embodiment shown, the hinges 142 comprise metal straps which are wrapped around the transverse portion 124 of the rod 122 and around the bottom edge portion 143 of the perimeter rod 141. The hinges 142 are rigidly affixed as by welding to the bottom portion 143. On the other hand, the hinges 142 pivotally surround the portion 124. Sideward movement of the closure member 62 is prevented by interference between the hinges 142 and adjacent longitudinal rods of the bottom wall 68. Thus, the closure member 62 may be pivotally moved forwardly and downwardly about the forward edge of the bottom wall 68 of the basket 61 to open the forward end of the basket 61. If desired, the closure member 62 may be pivoted to a dedepending, substantially vertical position beneath the forward edge of the basket 61. On the other hand, the closure member 62 may be moved to a position intermediate its closed and depending position, to a substantially horizontal position. The closure member may be maintained in such position by locating the carrier adjacent the check-out counter 140 (FIGURE 2) of the supermarket, the closure member 62 resting upon the top 145 of the check-out counter to form a ramp upon which goods may be moved out of the basket 61 and onto the check-out counter top 145. Upward and rearward pivotal movement of the opened closure member 62 about the axis of the portion 124 on the hinges 142 moves the upper portion of the closure member 62 toward the stop members 131 and 132. The transverse width of the closure member 62 is slightly less than the inside distance between the upstanding portions 123 of the rod 122. Thus, when the closure member 62 is closed, the side portions 146 and 147 of the perimeter rod 141 are spaced snugly between the upright portions 123 of the rod 122. Further rearward pivotal movement of the closure member 62 is prevented by abutment of the upper part of the side portions 146 and 147 of the perimeter rod 141 and the ends of the upper portion 148 of the perimeter rod 141 against the forwardly facing surfaces of the legs of the stop members 131 and 132. The central axis of the upper portion 148 of the closed closure member 62 spaced somewhat below the central axis of the upper leg of the stop member 132, here for example, by an amount generally comparable to the cross-sectional radius of the upper portion 148.

The closure member 62 is provided adjacent the upper ends of its side edges with rearwardly extending insertion members 151 and 152 affixed rigidly thereto (FIGURES 2, 4 and 5). The insertion members 151 and 152 are preferably comprised of identical, substantially rigid rods bent into a U-shaped configuration. Each insertion member has a vertically extending bight 153 spaced rearwardly from and parallel to the corresponding one of the side portions 146 and 147 of the perimeter rod 141. The longitudinal extent of the insertion members 151 and 152 from the perimeter rod 141 preferably exceeds the longitudinal thickness of the stop members 131 and 132, here by more than a hundred percent. Each of the insertion members 151 and 152 further includes a pair of legs 156 and 157 which extend forwardly from the ends of the bight portion 153 toward the rearward face of the corresponding one of the side portions 146 and 147 adjacent the upper ends thereof. The height of the insertion members 151 and 152 as seen in FIGURE 4 is less than the spacing between the legs 136 and 137 of the stop members 131 and 132 so that the insertion members can be inserted rearwardly into the openings 133 in the stop members. The insertion members 151 and 152 when so inserted are spaced closely to the bight portions 138 of the stop members 131 and 132 to prevent separation of said stop members, and hence, of the sides 66 and 67.

Thus, the closure member 62, when closed, acts through the connection of the insertion members 151 and 152 with the stop members 131 and 132 to brace the sides 66 and 67 of the basket 61 against outward movement. Moreover, since the side portions 146 and 147 of the closed closure member 62 lies snugly between the forward edges of the side walls 66 and 67, said closure member prevents significant inward movement of the side walls 66 and 67 toward each other. In addition, any tendency of the side walls 66 and 67 to parallellogram is prevented by the closed closure member 62.

The closure member 62 is provided with latch means 161. The latch means 161 are manually engageable and, when engaged, positively prevent opening of the closure member 62. The latch means 161 preferably comprise a transverse rod 162 of transverse extent similar to the closure member 62. In the present embodiment, the rods 122, 141, and 162 and the members 131, 132, 151 and 152 are preferably of the same cross-sectional diameter. The latch rod 162 is spaced from and pivotally affixed to the closure member 62 adjacent its upper end for pivotal movement with respect thereto. More specifically, the rod is provided with a plurality, here three, of preferably evenly spaced hooks 163. Each of the hooks 163 is fixed preferably by welding, to the underside, as seen, in FIGURE 3, of the rod 162 and extends forwardly therefrom to wrap closely but pivotally around the upper portion 148 of the perimeter rod 141. The hooks 163 allow pivotal movement of the latch rod 162 about the axis of the upper portion 148. The hooks 163 are preferably positioned closely adjacent ones of the vertical rods 139 of the closure members 62 to prevent transverse movement of the latch rod 162 from its preferred position of FIGURE 3. In the particular embodiment shown, the outer ones of the hooks 163 are snugly engaged with the inwardly spacing surfaces of the adjacent rods 139.

The hooks 163 space the latch rod 162 from the upper portion 148 sufficiently to allow the latch rod 162 to pass rearwardly over the top legs 136 of the stop members. This is accomplished with a spacing which exceeds the thickness of the stop members 131 and 132 by only a relatively small amount, possible movement of the closure member 62 when latched thus being negligible. To close the latch means 161, the latch rod 162 is thus manually pivoted from a position in front of the basket 61, such as indicated in broken lies at 162A, rearwardly over the upper portion 148 and stop members 131 and 132 to a position closely spaced to the rear of said stop members. The latch rod 162 is then allowed to rest upon the joint of the upper leg 156 and bight 153 of the insertion members 151 and 152. The upper legs 156 are spaced below the upper portion 148 sufficiently that the central axis of the latch rod is located below the central axis of the upper portion 148.

Thus, a forward force exerted on the closed closure member 62 will cause the ends of the latch rod 162 to move forwardly to abut the rearward face of the stop members 131 and 132 such force if sufficient may cause the latch rod 162 to ride upwardly along said stop members to a point even with the central axis of the member 148. Since, however, the axis of the member 148 is below the center of curvature of the upper legs 136 of the stop members 131 and 132, the latch member 162 will not ride further upwardly therealong in response to a forward force on the closure member 62. Thus, the latch 61 when closed positively locks the closure member 62 in a position for closing the forward end of the basket 61.

OPERATION

Although the operation of the carrier 10 embodying the invention has been indicated somewhat above same will be briefly summarized to insure a more complete understanding of the present invention.

With the closure member 62 in its closed and latched position indicated in FIGURES 1, 3, 4 and 5, same may be unlatched by manually gripping of the latch rod 162 and pivoting same upwardly and forwardly about the axis of the upper portion 148 of the closure member through the position 162A of FIGURE 4 and allowing same to drop to a position on the forward side of the closure member 62. Thereafter, the closure member 62 may be manually pivoted forwardly by means of the hinges 142 about the axis of the transverse portion 124 on the forward edge of the bottom wall 68. Opening movement of the closure member 62 may be continued through the position illustrated in FIGURE 2 and the closure member may be left to depend substantially in a vertical position below the forward end of the basket 61. With the closure member 62 open, goods may be readily loaded into or unloaded from the basket 61 through the open forward end thereof without lifting such goods over the relatively high side walls 66 and 67 of the basket. To move the closure member 62 into its closed position of FIGURE 1 and to latch same, the above steps may be reversed. Alternatively, as suggested above, the closure member 62 may be opened to its substantially horizontal position of FIGURE 2 and supported in such position by resting upon the top 145 of the check-out counter 140 for use as a ramp upon which goods may be slid from the carrier and onto the counter top. In such position, the lower face or portion of the closure member 62 normally rests upon the counter top 145. In the particular embodiment shown the level of the counter top 145 is somewhat below that of the bottom 68 of the basket 61 so that the weight of the closure member 62 is carried by the bottom or outer face of the upper portion 148 of the perimeter rod 141. Alternatively, it is contemplated that the counter top 145 may lie somewhat above or on the same level as the bottom 68 of the basket 61 in which case the side portions 147 and 146 will bear on the counter top.

With the closure member in its closed and latched position, forward motion of the closure member 62 is prevented by interference between the ends of the latch rod 162 and the rearward surfaces of the stop members 131 and 132 engaged thereby. Rearward motion of the closure member 62 is prevented by interference between said closure member and said stop members. Outward motion of the side walls 66 and 67 is prevented by interference between the bights 138 of the stop members 131 and 132 and the legs 156 and 157 of the insertion members 151 and 152. Inward movement of the side walls is prevented by interference between the side portions 146 and 147 of the closure member 62 and the upstanding portions 123 at the forward edges of the side walls.

With the closure member 62 in its closed and latched position of FIGURE 1, the latch means 161, stop members 131 and 132 and insertion members 151 and 152 as well as the hinges 142 lie substantially within the confines of the basket 61 and do not extend materially therebeyond. As a result, the front end of the basket 61 has no tendency to catch or bind when inserted into the rearward end of a similar carrier basket for nesting engagement therewith and is capable of bearing against and raising the swinging rearward wall of such other carrier basket in order to gain nesting access thereto.

Although a particular preferred embodiment of the invention has been disclosed above for illustrative purposes it will be understood that variations or modifications thereof which lie within the scope of the appended claims are fully contemplated.

The embodiments of the invention in which an exclusive property or privilege is claimed are defined as follows:

1. In a basket construction for a shopping carrier, the combination comprising:
   a spaced pair of generally upstanding side walls and a bottom wall extending between said side walls;
   a movable end wall disposed adjacent the ends of said side and bottom walls and operable for opening or closing the end of the basket construction;
   hinge means pivotally connecting the lower edge of said end wall with the forward edge of said bottom wall;
   interengageable means on said end wall and side walls adjacent the upper edges thereof for resisting relative movement between said upper edges of said walls adjacent said end wall when said end wall is positioned to close the end of said basket, said interengageable means including elements projecting transversely from said side walls and interfitting members on said end wall projecting toward said side walls and capable of interfitting with said element;
   latch means for preventing pivotal movement of said end wall about the hinge means, said latch means being releasable to allow such pivotal movement.

2. The device defined in claim 1 in which said interengageable means include:
   stop means extending inwardly from the upper portions of the ends of said side walls for abutting said end wall to prevent movement thereof into said basket; and
   insertable members on said end wall adjacent the side edges thereof insertable through said stop means when said end wall is in its closed position for preventing sideward motion of the ends of the side walls.

3. The device defined in claim 2 in which said latch means includes:
   a transversely extending latch bar spaced from the upper edge of said end wall and pivotally affixed thereto for movement into and out of the basket, the ends of said bar when inside said basket lying on the inner side of said stop means whereby movement of the upper edge of the end wall away from interior of the basket is prevented by interference between the ends of said transverse rod and said stop means.

4. The device defined in claim 1 in which:
   said interengageable means on said side walls comprises a generally U-shaped stop member located adjacent the upper edge of each of said side walls and spaced from the forward edges thereof a distance corresponding to the thickness of said end wall, said stop members each having a vertically spaced pair of legs extending transversely inwardly from and rigidly fixed to the corresponding one of said side walls, and a substantially vertical bight portion connecting the inner ends of said legs at a location spaced from said corresponding side wall for defining an opening therethrough; and
   said interengageable means on said end wall comprises insertion members rigidly affixed to the inner face of said end wall and extending rearwardly therefrom through said openings in said stop members when said end wall is in its closed position to assist in preventing inward and outward motion of the side walls.

5. The device defined in claim 4 in which each of said insertion members comprises a substantially rigid rod bent into a U-shaped configuration, said rod having a bight portion parallel to and spaced rearwardly from said end wall by a pair of rearwardly extending legs, said bight portion being aligned with the side edges of said end wall and being spaced somewhat below the upper edge thereof, the length of said bight being less than the height of said opening in said stop members to allow entrance of said insertion members therethrough, the extent of such insertion members from said end wall being greater than the longitudinal thickness of said stop members so that said insertion members extend rearwardly past said stop members when said end wall is closed.

6. The device defined in claim 5 in which said latch means comprises a transversely extending latch bar spaced from the upper edge of said end wall and pivotally affixed thereto for movement between a position outside the basket and a position within the basket, the spacing of said latch bar from said end wall exceeding the longitudinal thickness of said stop members so that said latch bar may be pivoted over the top of said stop members to a position therebehind, the pivot axis of said latch bar lying below the central axis of said upper legs of said stop members so that a forward force on said end wall will engage the ends of said latch bar with the rearward surfaces of said stop means and prevent opening of said end wall, said latch bar extending above said insertion members for normally resting thereon when in latched position.

7. The device defined in claim 6 in which said basket is comprised of welded metal rods forming integral meshlike side and bottom walls and including a rod defining the forward edges of said side and bottom walls;
said end wall is comprised of a plurality of metal rods welded together to form a grid having edges defined by a perimeter rod; and
said hinge means comprises a plurality of spaced metal straps pivotally engaging the forward edge of said bottom wall and rigidly affixed to the bottom edge portion of said perimeter rod, said hinge means being arranged so that the lower edge of said end wall lies closely spaced above the forward edge defining rod of said bottom wall.

8. A shopping carrier construction comprising:
a mobile frame and a container supported thereon, said container having a generally rectangular opening in a wall thereof defined on three sides by perimetral edge elements and the other side thereof being open;
a generally rectangular closure member for closing said opening, said closure member having a smaller perimeter than said opening so that it can be received within said opening and between said edge elements;
hinge means pivotally connecting said closure member along one edge thereof to said container so that said closure member can move between a first position in which it is located within said opening so that said opening is substantially closed and a second position spaced from said opening so that the contents of the container can be discharged;
said closure member when in said first positon preventing appreciable movement of opposing perimetral edge elements toward each other and said edge elements protecting said closure member from damage;
a transversely extending latch bar mounted on said closure member adjacent a second edge thereof opposite said one edge for pivotal movement about a substantially horizontal axis parallel with said bar around said second edge of said closure member toward and away from said container;
abutment means on said container adjacent said edge elements whereby said latch bar can be positioned on the opposite side of said abutment means from said closure member to releasably secure said closure member in a position closing said opening.

9. In a basket construction for a shopping carrier, the combination comprising:
a pair of generally upstanding, spaced-apart side walls and a bottom wall extending between said side walls;
a movable end wall disposed adjacent the ends of said side and bottom walls and operable for opening or closing the end of the basket construction;
hinge means pivotally connecting the lower edge of the end wall with the forward edge of the bottom wall;
a transversely extending latch bar mounted on said end wall adjacent the upper edge thereof for pivotal movement about a substantially horizontal axis parallel with said bar over the upper edge of said end wall toward and away from said side walls; and
abutment means on said side walls adjacent said ends thereof whereby said latch bar can be positioned on the opposite side of said abutment means from said end wall to releasably secure said end wall in a position closing the end of the basket construction.

References Cited by the Examiner
UNITED STATES PATENTS 2,943,707    7/1960    Ramlose.
3,036,722    5/1962    Sharaway.
3,039,564    6/1962    Shaukis.

EVON C. BLUNK, *Primary Examiner.*

H. C. HORNSBY, *Assistant Examiner.*